United States Patent [19]

Hara et al.

[11] 4,250,596
[45] Feb. 17, 1981

[54] FASTENING SYSTEM FOR SECURING A TRIM-FIXING DEVICE TO A SUBSTRATE

[75] Inventors: Kunio Hara, Kawasaki; Osamu Kitamura, Toyota; Katsuji Yamaguchi, Hiratsuka, all of Japan

[73] Assignee: Nifco, Inc., Yokohama, Japan

[21] Appl. No.: 95,686

[22] Filed: Nov. 19, 1979

Related U.S. Application Data

[63] Continuation of Ser. No. 949,309, Oct. 6, 1978, abandoned.

[51] Int. Cl.³ .............................................. A44B 21/00
[52] U.S. Cl. ............................ 24/73 HS; 24/73 MS; 24/73 PM; 24/73 VA; 24/90 HA; 52/232; 52/309.3; 52/718; 52/DIG. 4; 156/66; 156/278; 156/294; 156/297; 293/128; 428/31; 428/347
[58] Field of Search .................. 152/66, 71, 278, 280, 152/292, 297, 298, 305, 293, 294; 52/232, 717, 718, 309.3, DIG. 4; 24/73 FT, 73 HS, 73 MS, 73 PM, 73 VA, 73 R, 201 B, 90 HA, DIG. 11; 293/1, 126–128; 428/31, 346; 248/205 A, 206 A

[56] References Cited

U.S. PATENT DOCUMENTS

| 2,742,984 | 4/1956 | Bedford, Jr. | 52/718 |
| 3,032,459 | 5/1962 | Uhleen | 156/278 |
| 3,543,465 | 12/1970 | Jackson | 428/31 X |
| 3,683,461 | 8/1972 | Weidemann | 24/73 HS |
| 3,837,984 | 9/1974 | Wagner et al. | 52/717 X |
| 3,897,288 | 7/1975 | Fayling | 52/DIG. 4 X |
| 3,902,949 | 9/1975 | Norman | 156/305 X |

*Primary Examiner*—John T. Goolkasian
*Assistant Examiner*—Thomas E. Bokan
*Attorney, Agent, or Firm*—Thomas W. Buckman; Richard O. Gray, Jr.

[57] ABSTRACT

A method of fixing trim on an object to be bake-painted and a device for carrying out said method are disclosed. The device for fixing trim on the object to be bake-painted has a depression from therein and the depression is filled with a thermosetting synthetic adhesive. A strong bond between said trim-fixing device and an object is obtained by temporarily attaching the device with a suitable means to the object at a prescribed position and heat-treating the painted object with the device temporarily attached and thereby, curing the paint and the adhesive and at the same time, bonding the trim-fixing device fast to the object by the adhesive.

8 Claims, 14 Drawing Figures

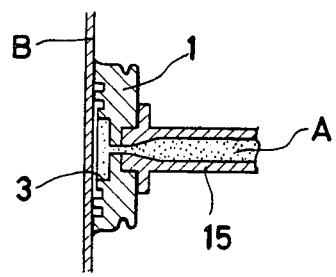
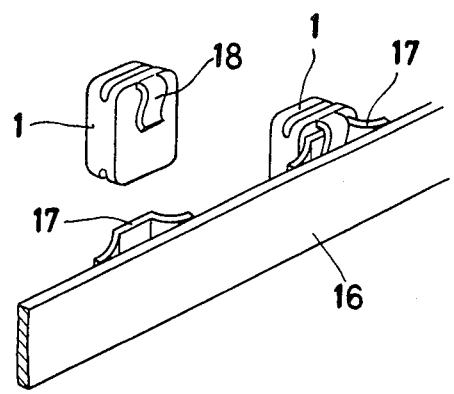
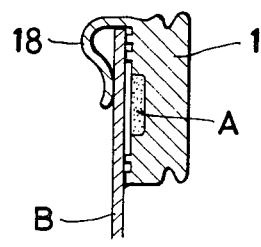
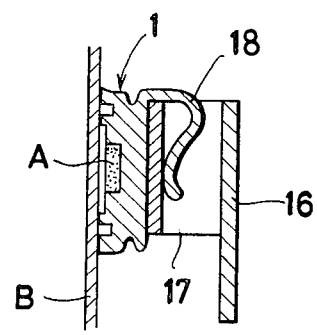

FASTENING SYSTEM FOR SECURING A TRIM-FIXING DEVICE TO A SUBSTRATE

This is a continuation of application Ser. No. 949,309, filed Oct. 6, 1978, abandoned.

BACKGROUND OF THE INVENTION

This invention relates to a device for fixing trim on a given object such as an automobile body and to a method for fast bonding of the trim-fixing device to the object.

Various types of trim—for example, molding are placed on the sides of automobile bodies for decorative purposes and to cover edges of window frames. Heretofore such trim has invariably been fixed in position by being passed through T-studs of a metallic material, clips or other similar holding means spaced and fastened in position on automobile bodies. In the conventional methods, the trim is jointed to such holding means by welding, by mechanical means or with the aid of a double-faced adhesive tape.

A strong retaining force is obtained by welding or by use of mechanical elements such as screws and nuts, but such methods have disadvantages in that they may damage the metal surface of automobile bodies and entail complicated work. Double-faced adhesive tape is easy to use for fixing clips for retaining trim on automobile bodies but has a disadvantage in that such tape offers relatively weak retaining force.

An object of this invention is to provide trim-fixing device capable of readily and strongly fixing trim on a given object to be bake-painted and a method providing easy, accurate and fast bonding of the trim-fixing device to the object.

SUMMARY OF THE INVENTION

To accomplish the object described above according to the present invention, there is provided a trim-fixing device having applied to the inner surface thereof which surface comes into direct contact with the object, a thermosetting synthetic adhesive capable of exhibiting its adhesive property on being heated at the temperature of baking the finishing coat of paint on the object and subsequently cooled. The method for fast bonding the trim-fixing device to the object comprises the steps of temporarily attaching the device to the object at a prescribed position by a temporary attaching means and then heat-treating the object with the device thus temporarily attached, thereby curing and setting both the paint and the adhesive and simultaneously bonding the trim-fixing device fast to the object.

The trim-fixing device of this invention comprises a thermosetting synthetic adhesive, a depression for accommodating the adhesive, grooves for retaining the trim in position and a temporary attaching means to temporarily fix the device on the object.

By the use of thermosetting adhesive, the bonding of the trim to the object—for example, automobile body is accomplished at the same time that the paint on the automobile body is heat treated, resulting in simplification of the work involved. The adhesive of the type specified herein provides a strong enough bond to keep the trim intact despite the impacts received while the automobile is in use.

The temporary attachment of the device is simple work and accurate positioning of the member on the automobile body is accomplished with great ease. Other objects and other characteristic features of the present invention will become apparent from the detailed description given herein below with reference to the accompanying drawing.

BRIEF EXPLANATION OF THE DRAWING

FIG. 8 is an explanatory diagram illustrating one manner of the injection of the adhesive into the trim-fixing device of the present invention.

FIGS. 9(A) and 9(B) are a perspective view and a sectional view of a further preferred embodiment of the trim-fixing device incorporating a temporary attaching means according to the present invention.

FIG. 10 is a sectional view of yet another preferred embodiment of the trim-fixing device of the present invention.

DETAILED DESCRIPTION OF THE INVENTION

Figure 1:
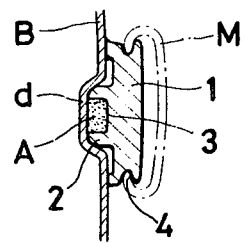
FIG. 1 is a sectional view of the first preferred embodiment of the trim-fixing device according to the present invention.

FIG. 1 illustrates a first embodiment of the trim-fixing device 1 of this invention attached to a substrate so as to retain thereon a kind of trim such as a molding M. The fixing device 1 possesses a protuberance 2 matching in shape a dent d which is formed in advance in a given object such as an automobile body B. An inner depression 3 of the protuberance 2 is filled to capacity with a thermosetting, synthetic (hot-melt) adhesive A which acquires its adhesive property on being treated and subsequently cooled. This thermosetting adhesive is of a type which softens at the temperature at which the finishing coat of paint applied to the automobile body is baked and, after baking sets as the applied coat cools off. The trim-fixing device 1 is temporarily attached to the dent d of the automobile body prior to the heat treatment of the paint, therefore, the device 1 is joined fast to the automobile body by the time the paint application by baking is completed.

The trim-fixing device 1 is molded with a plastic material possessing high thermal resistance to avoid being deformed even at the aforementioned baking temperature and, in order to serve additionally as a temporary attaching means in the first preferred embodiment, incorporates a powdered magnetic substance. The grooves 4 which are provided along the edges of the device 1 are intended for retaining in position a molding trim M which is attached to the device after the device has been fixed on the automobile body.

Figure 2:
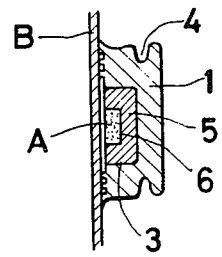
FIG. 2 is a sectional view of the second preferred embodiment of the trim-fixing device of this invention.

In the second preferred embodiment illustrated in FIG. 2, one permanent magnet 5 is used in the place of the temporary attaching means formed by incorporating a powdered magnetic substance during the molding of the trim-fixing device of the first preferred embodiment. This magnet 3 is set within the inner depression 3 of the device 1 and has of a cavity 6.

When the trim-fixing device of the construction described above is fixed to the automobile body at a prescribed position prior to baking of the paint, it is temporarily held in contact with the automobile body by the magnetism of the magnet 5. The automobile body with the device thus held thereon is forwarded to the stage for baking of the paint and is exposed to the baking temperature. Consequently, the thermosetting adhesive A melts and flows into the minute space left intervene between the automobile body B and the trim-fixing device 1. After the paint has been baked, the device is cooled in conjunction with the automobile body and the adhesive which flowed into the space described above begins to harden until a strong fast bond is obtained between the automobile body and the trim-fixing device.

In the present preferred embodiment, the skirtlike edge of the trim-fixing device which comes into contact with the automobile body projects to occlude the minute space between the automobile body and the trim-fixing device thus preventing leakage of the adhesive which melts and flows during the baking treatment. The grooves 4 which are provided in the opposite edges of the trim-fixing device 1 are, as in the first embodiment, for permitting attachment of the molding to the automobile body.

Figure 3:
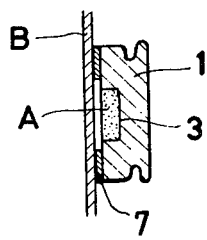
FIGS. 3(A) and 3(B) are a sectional view and a perspective view of the third preferred embodiment of the trim-fixing device of the present invention.
Figure 3:
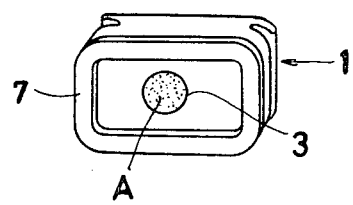

In the third preferred embodiment illustrated in FIG. 3, a double-faced adhesive tape 7 is used in the place of the magnetic temporary attaching means in the preceding preferred embodiment. As illustrated in FIG. 3(B), the adhesive tape 7 is placed along the entire edge portion of the inner surface of the trim-fixing device 1 which comes into contact with the automobile body. When this device 1 is fixed on the automobile body, the adhesive tape occludes the space between the automobile body B and the device 1 in much the same way as in the second preferred embodiment.

The double-faced adhesive tape 7 melts during the baking of the paint application, but the molten adhesive tape offers no obstruction and the eventual adhesion of the device 1 to the automobile body relies solely upon the adhesive force of the thermosetting adhesive A.

Figure 4:
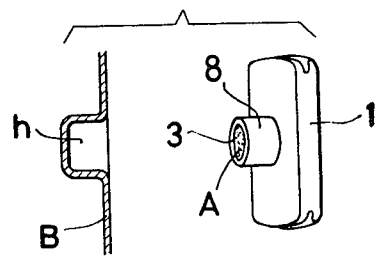
FIG. 4 is a perspective view of the fourth preferred embodiment of the accessary-fixing member of the present invention.

In the fourth preferred embodiment illustrated in FIG. 4, the trim-fixing device 1 is provided with a protrusion 8 having an inner depression 3 which mates with a hollow h formed in advance in the automobile body. The height of this protrusion 8 is slightly less than the depth of the hollow h so that when the device 1 is temporarily attached to the autombile body B, a space is left between the bottom of the hollow h and the leading end of the protrusion 8. The thermosetting adhesive A which is contained in the inner depression of the protrusion 8 melts and flows into the space during the baking of the paint, eventually bringing about a strong bond between the bottom of the hollow h and the leading end of the protrusion 8.

In this preferred embodiment, since the hollow h receives and snugly retains in position the protrusion 8, none of the temporary attaching means involved in the preceding preferred embodiments is required. A knurled groove may be formed on the outer periphery of the protrusion 8 to improve the holding power of the bond finally produced by the thermosetting adhesive A.

Figure 5:
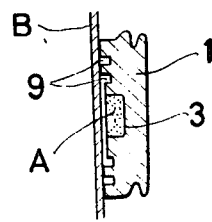
FIGS. 5(A) and 5(B) are a sectional view and a perspective view of the fifth preferred embodiment of the trim-fixing device of the present invention.
Figure 5:
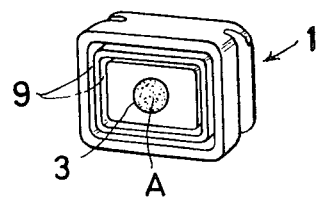

In the preferred embodiments illustrated in FIGS. 2 and 3, a minute space is formed between the automobile body B and the trim-fixing device 1 to permit thorough distribution of the molten adhesive A. In the fifth preferred embodiment illustrated in FIG. 5, two narrow parallel grooves 9 are formed around the space to ensure that there will be no leakage of the molten adhesive from the device proper.

Figure 6:
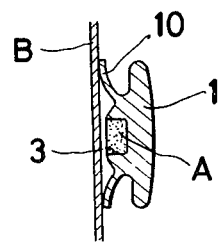
FIG. 6 is a sectional view of the sixth preferred embodiment of the trim-fixing device of the present invention.

In the sixth preferred embodiment illustrated in FIG. 6, the trim-fixing device is formed in the shape of a T-stud and is provided with an elastic skirt 10. When this trim-fixing device 1 is pressed against the autombile body B, the air entrapped inside the skirt 10 is forced out. After the pressure applied to the skirt 10 is removed, the vacuum produced inside the skirt 10 keeps the device temporarily attached to the automobile body by suction. Since the skirt 10 imparts such powerful airtightness to the device 1 it positively prevents any molten adhesive from leaking from the device proper.

The fifth and sixth preferred embodiments described above specifically directed toward effectively preventing leakage of the thermosetting adhesive A taking into consideration the possibility of the use of an auxiliary holder jig which is required where a multiplicity of trim-fixing devices are to be correctly disposed at prescribed positions as will be explained below.

In the case where a plurality of trim-fixing devices 1 are arranged on the window frame of an autombile body, for example, these devices 1 must be positioned in one straight line so as to ensure perfect linearity of the molding which will be fastened by the devices to the automobile body afterward. To this end, use of an auxiliary jig 11 such as is shown in FIG. 7 becomes necessary.

Figure 7A:
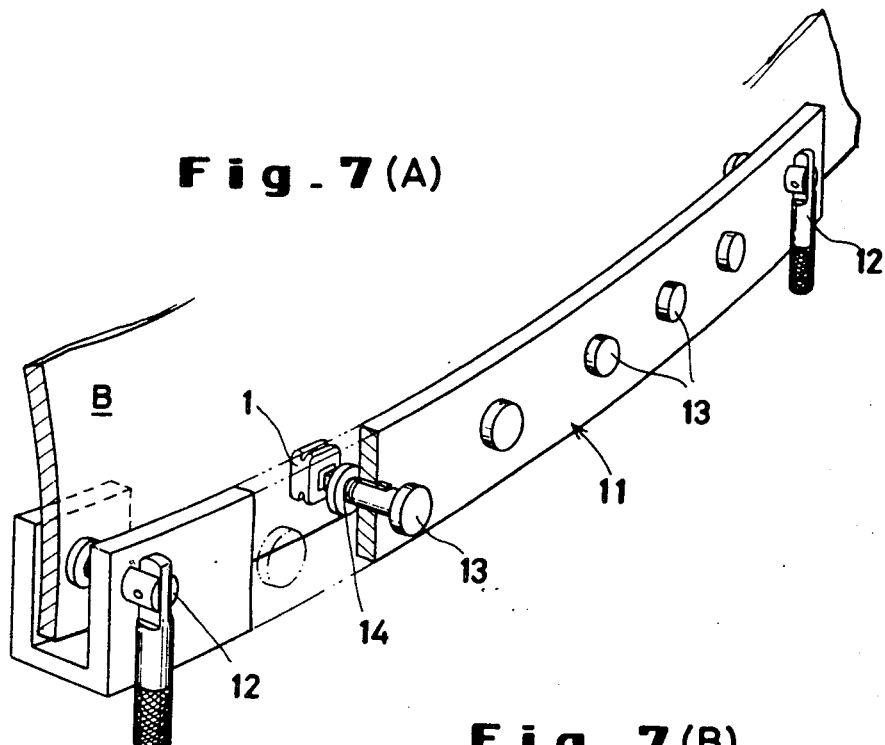
FIG. 7(A) is an explanatory diagram illustrating one preferred embodiment of means for temporary attachment of the trim-fixing device according to the present invention.

The jig 11 is provided at each of the opposite ends thereof with a clamp means 12 adapted to be fastened to a proper edge of the automobile body B. The clamp means 12 of the present preferred embodiment is so designed that a downward turn of the handle thereof causes a metal strap to grip the edge of the automobile body by virtue of the energizing force generated by a spring as illustrated in FIG. 7(A). Of course, the construction of the auxiliary holder jig 11 is not limited to that which is illustrated; other mechanical means adapted to get a firm hold of the edge of the automobile body—for example, screws or leaf springs, may be used.

The jig 11 is further provided at prescribed points in the direction of its length with a required number of part holder means 13. This part holder means 13 comprises a bar, a flange being formed at each extremity of the bar and a spring 14 placed around the bar and in contact with the flange falling on the automobile body side. This spring 14 serves to press the trim-fixing device 1 against the automobile body for temporary attachment thereto. The trim-fixing device 1 is prevented from accidental inclination or dislocation by forming a non-circular recess in the head of the trim-fixing device in advance, providing on the terminal side of the inner flange of the part holder means 13 a projection matched to the aforementioned non-circular hole and disposing a key in part of the bar of the part holder means.

Figure 7B:
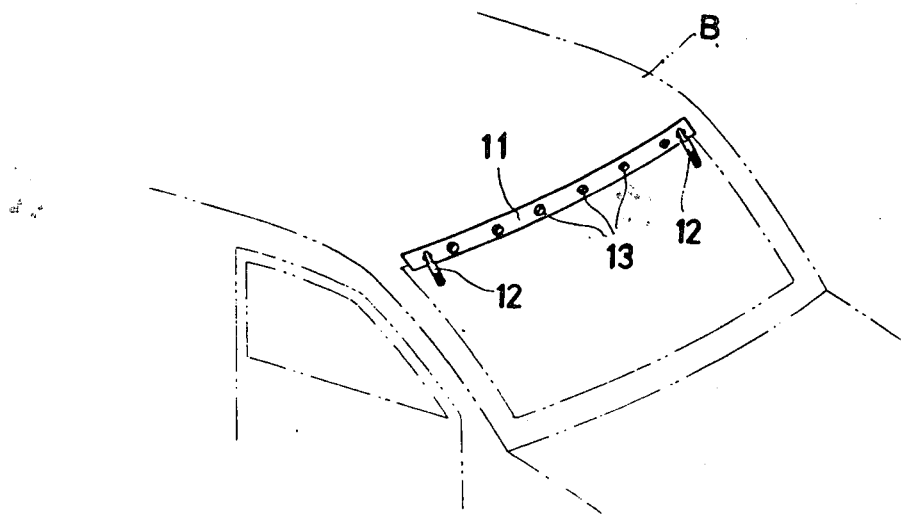
FIG. 7(B) is an explanatory diagram illustrating the trim-fixing device attached to a given substrate through the medium of the means of FIG. 7(A).

Effective use of this jig 11 enables a plurality of trim-fixing devices to be easily and accurately fixed in position on the window frame of the automobile body, for example, as illustrated in FIG. 7(B).

In another method the thermosetting adhesive A is placed in advance in the inner depression 3 of the trim-fixing device 1 to bring about an effect similar to the effect obtained with the use of the jig described above. Specifically, a conduit is formed to permit communication between the non-circular hole provided in the head of the trim-fixing device illustrated in FIG. 7(A) and the inner depression 3 as shown in FIG. 8, and an adhesive feeding nozzle 15 matched to the hole in the head is fastened to the conduit to permit injection of the thermosetting adhesive A. For injecting the adhesive A, an apparatus having a plurality of such nozzles 15 spaced like the part holder means 13 in the aforementioned jig 11 or a manually operated adhesive gun may be used.

After a suitable amount of the adhesive has been placed in the inner depression of each of the trim-fixing device 1 as illustrated in FIG. 8, the nozzle 15 is removed and the devices 1 are held in position by the jig 11 of FIG. 7(A).

Where desired, a jig of simple construction may be composed of a steel belt 16 and leaf springs 17 fastened to the steel belt as illustrated in FIG. 9. Effective use of this jig is achieved by providing each of the trim-fixing devices with a clip 18 which is adapted to be hooked onto a leaf spring 17. Since these trim-fixing devices are molded integrally of a plastic material, they are not difficult to fabricate. Temporary attachment of the trim-fixing devices to the automobile body is accomplished by using clips 18 to hang the devices from the leaf springs 17 and fixing the devices to the automobile body at the prescribed positions.

In contrast to the trim-fixing device 1 of FIG. 9 which has the clip 18 disposed on the outer side relative to the surface opposed to the automobile body B, the trim-fixing device 1 may have the clip 18 disposed on the side thereof opposed to the automobile body B as illustrated in FIG. 10 so that the device can be hooked directly on the edge of the automobile body. The clip 18 thus fastened to the trim-fixing device can serve as the temporary attaching means in any of the preferred embodiments of FIGS. 1 through 4. Of course, the use of this particular temporary attaching means is limited to objects having plate-shaped edges.

In all the preferred embodiments of this invention described above, the trim-fixing devices use a thermosetting adhesive which melts within the temperature range used for baking the paint and they are temporarily attached to the automobile body by suitable temporary attaching means until the cooled adhesive produces a strong bond. Thus, the present invention permits the trim-fixing devices to be fastened to the automobile body strongly and accurately by simple work without any damage to the automobile body. Further it is amply adapted to varying models of automobile.

In the preferred embodiments described above, the trim-fixing devices have been described with reference to attachment of molding to automobile bodies, but the invention is not to be limited by these examples. These devices can be effectively utilized as auxiliary fixing devices for not only automobile bodies but also for applying trim to other objects when they are provided with suitable hook means or other holding means.

What is claimed is:

1. A fastening system for securing a trim-fixing device to a substrate, the substrate including a cavity and the trim-fixing device including an interfitting protuberance, the protuberance including a recess carrying thermosetting adhesive wherein upon application of heat to the adhesive the device is bonded to the substrate while the protuberance and cavity provide a mechanical resistance to lateral forces on the device.

2. The system of claim 1, including means to temporarily attach the device to the substrate during the curing of the adhesive.

3. The system of claim 2, wherein the protuberance is snugly retained by a friction fit within the cavity thereby serving to temporarily retain the device to the substrate.

4. A fastening system for securing a trim-fixing device to a substrate, the trim-fixing device including a peripherally closed recess filled with a thermosetting adhesive, the opening of the recess carrying the thermosetting adhesive being superimposed over a portion of the substrate surface so as to be bonded thereto, means to temporarily secure the device to the substrate prior to curing the adhesive, the device further including seal means disposed radially outwardly from the closed recess to prevent the adhesive from flowing outwardly from the bonded surface created between the device and the substrate.

5. The system of claim 4, wherein the trim-fixing device is provided with a conduit between the external surface of the fixing device and the recess to permit injection of adhesive into the recess.

6. The system of claim 4, wherein a magnetic means is the temporary attaching means.

7. The system of claim 4, wherein double faced, pressure sensitive tape is the temporary attaching means.

8. The system of claim 4, wherein the substrate is provided with a cavity and the trim-fixing device is provided with a protuberance, the protuberance including the recess wherein the combination of cavity and protuberance forms the temporary attaching means.

* * * * *